United States Patent Office 3,003,639
Patented Oct. 10, 1961

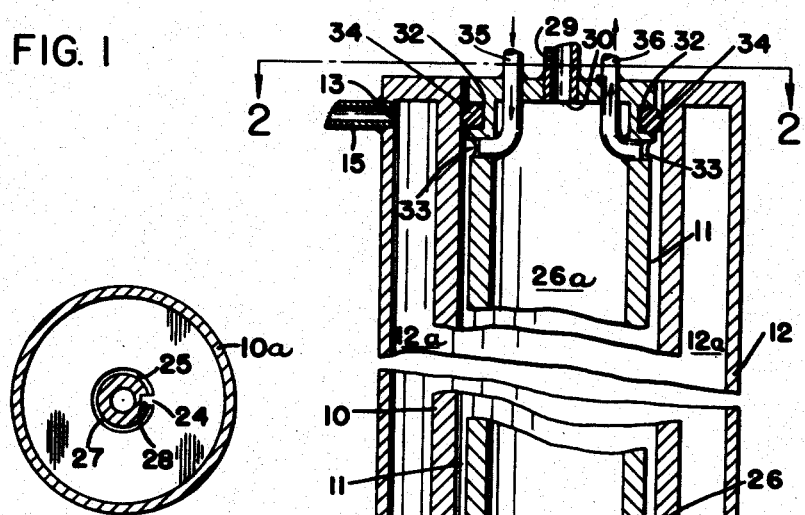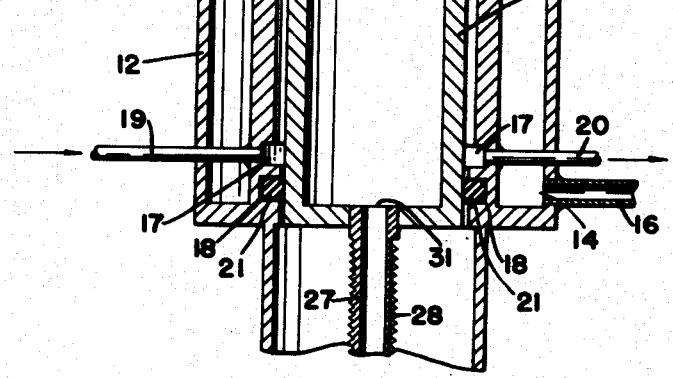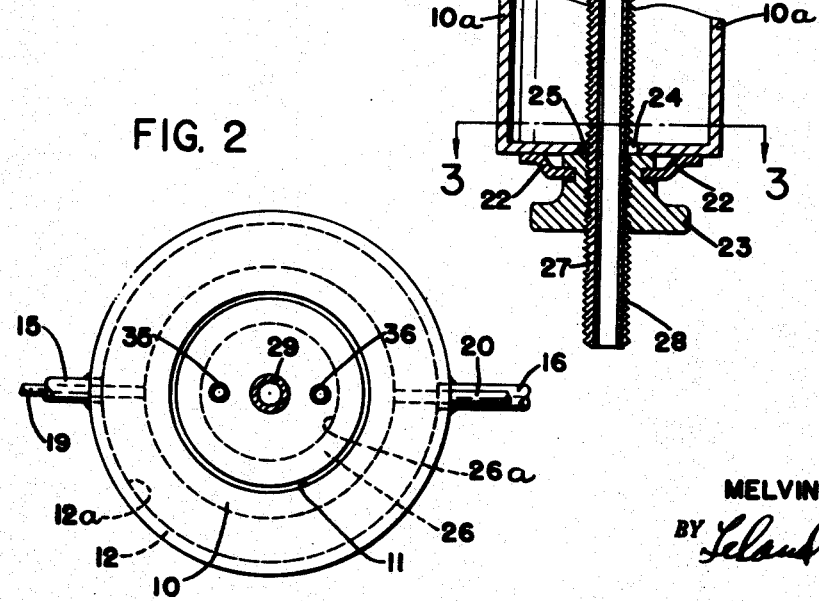

3,003,639
CONTINUOUS-FLOW VARIABLE SLIT HEIGHT THERMAL DIFFUSION COLUMN
Melvin M. Fink, Cleveland, Ohio, assignor, by mesne assignments, to Universal Oil Products Company, Des Plaines, Ill., a corporation of Delaware
Filed Sept. 12, 1956, Ser. No. 609,464
3 Claims. (Cl. 210—176)

The present invention relates to improved thermal diffusion apparatus. More particularly, the invention relates to a thermal diffusion apparatus having a variable slit length.

The more important variables in a thermal diffusion operation are the temperature level of the operation, i.e., the mean between the temperatures of the hot and cold surfaces, particularly in relation to the viscosity of the material to be subjected to thermal diffusion, the rate of feed of the material through the slit, the magnitude of the temperature gradient, the degree of separation desired, and the ratio of the rates of withdrawal of the products.

These variables which are interdependent, for the most part, are also dependent upon the following additional variable factors in the apparatus used to carry out the separation: the slit width, i.e. the distance between the hot and the cold wall or the distance of the thermal diffusion section across which a temperature gradient is maintained; the surface area of each slit, i.e., the sum of products of the length and the outside and inside circumferences of the inner and outer tubes, respectively. The effect these variables have upon one another are known to or can readily be determined by one skilled in the art.

It has been found that there is a definite optimum slit length for the thermal diffusion operation on a given material at which maximum separation will be obtained, all other factors being constant. The optimum slit length will vary depending upon the properties of the material to be separated if all other variables, such as slit width and temperature gradient, are constant. For example, the separation of a mixture of ethylene glycol and benzyl alcohol will require a different slit length for optimum separation than the optimum which will be required for the separation of a mixture of isopropyl benzene and hexadecane, again with all other variables constant.

The other factors, such as slit width and the temperatures of the hot and cold wall, are generally also selected so as to be optimum for the material to be thermally diffused. Once these are selected, however, there will be an optimum for the slit length; slit lengths less than the optimum will not give as good a separation as the optimum length; slit lengths more than the optimum length will not give any better separation than does the optimum length and will use more heat for no enhanced effect. Accordingly, it is an object of my invention to provide a thermal diffusion apparatus in which the length of the slit can be varied.

In brief, my invention is a tubular type thermal diffusion apparatus comprising a pair of tubular members in which one of the tubes is adjustable with respect to the other in an axial direction so that effective length of the separation chamber may be varied at will. With the apparatus of this invention, it is possible to make full advantage of the aforesaid optimum slit length.

The invention will be better understood by referring to the attached patent drawing, wherein similar numerals denote similar parts throughout and:
FIGURE 1 is a cross-sectional view of the entire apparatus;
FIGURE 2 is a top view of the apparatus partly in section taken along line 2—2 of FIGURE 1 looking in the direction of the arrows; and FIGURE 3 is a cross section on line 3—3 of FIGURE 1 looking in the direction of the arrows.

Referring now particularly to FIGURE 1, the apparatus of this invention is constructed in the following manner: An inner tubular member 26 is concentrically disposed within an outer tubular member 10 so as to leave a uniform annular space 11 therebetween which serves as the separation chamber. The annular space 11 has a width not exceeding 0.15 inch and usually less than 0.060 inch.

The tubular member 10 is provided with a hollow jacket 12 adapted to accommodate a heat transfer fluid. The jacket 12 is provided with openings 13 and 14 through which the heat transfer medium may be introduced and withdrawn by means of the conduits 15 and 16.

The inner tubular member 26 has a hollow interior 26a and a hollow extension 27 communicating therewith at the opening 31. A heat transfer medium may be introduced and withdrawn from the hollow interior 26a of tubular member 26 by means of the conduit 29 which communicates with an opening 30 in the tubular member 26 and the hollow stem 27.

The tubular member 10 has a recessed port groove 17 near the lower extremity of the jacketed portion, which has a pair of conduits 19 and 20 communicating therewith at opposite sides. The groove 17 forms a reservoir leading to the thermal diffusion slit 11 and the conduits 19 and 20 may be used to introduce or withdraw liquids from the separation chamber 11. The tubular member 26 has a recessed groove 33 located near its upper extremity which serves as a reservoir for the separation chamber 11 and has a pair of conduits 35 and 36 communicating therewith. Liquid may be introduced or withdrawn through the conduits 35 and 36.

The tubular member 10 also has a recessed groove 18 which is adapted to accommodate an O-ring gasket 21 which seals the annular space 11 at the bottom thereof. The tubular member 26 also has a groove 32 which is adapted to accommodate an O-ring gasket 34 which seals the annular space 11 at the top thereof.

The tubular member 10 has a hollow extension 10a which extends below the thermal diffusion separation chamber 11. The hollow extension 10a has nut-retaining means 22 affixed or secured to the bottom thereof which are adapted to accommodate the knurled nut 23. The bottom of hollow member 10a is also provided with a key 24 in an opening 25.

The tubular member 26 is positioned within the tubular member 10 so that the hollow extension 27 which is externally threaded passes through the opening 25 in the extension 10a of tubular member 10 and engages the knurled nut 23. The threaded extension 27 has a keyway 28 in its face. A key 24 in opening 25 engages the keyway 28 in extension 27 so as to prevent the rotation of the tube 26 with respect to the tubular member 10 when the nut 23 is rotated.

The effective length of the separation chamber, i.e. the distance from the reservoir 33 to the reservoir 17, may be adjusted by turning the nut 23 which will raise or lower the tubular member 26 within the tubular member 10. Since the slit 11 which serves as the thermal diffusion separation chamber is sealed by the O-rings 21 and 34 which are free to rotate in their respective grooves 18 and 32, the adjustment of the slit length can be accomplished while the apparatus is in use since the separation chamber 11 remains effectively sealed at all times. The conduits 26, 35 and 36 may be connected to flexible conduits to accommodate this movement.

The O-ring gaskets which are to be employed in the apparatus of this invention are made from any resilient material such as rubber, nylon, plastic, and like materials. Preferably, the O-ring gaskets are made from material which will be unaffected by the liquid which is to be separated in the apparatus.

The apparatus described herein may be used to conduct a variety of thermal diffusion flow patterns. For example, a material may be fed simultaneously to conduits 35 and 19 while the products may be withdrawn at conduits 36 and 20.

Modifications of the embodiment of the invention described herein may occur to those skilled in the art, but I desire this application for Letters Patent to cover all such modifications as would reasonably fall within the scope of the appended claims.

I claim:

1. A thermal diffusion apparatus comprising a stationary outer tubular member and an inner tubular member having a smaller outside diameter than the inside diameter of said outer tubular member movably mounted in concentric relation to said outer member, said outer tubular member having a seal retaining means and a seal operatively associated therewith, said inner tubular member having a seal retaining means and a seal operatively associated therewith spaced apart from said retaining means and seal associated with said outer member so as to provide a thermal diffusion separation chamber in the annular space between said outer and inner tubular members, inlet conduit means for introducing a liquid to said separation chamber, two outlet conduit means for withdrawing two liquid products simultaneously from said separation chamber, first port means communicating with one of said outlet conduit means and said separation chamber located at the upper extremity of said inner tubular member, second port means communicating with the other of said outlet conduit means and said separation chamber located at the lower extremity of said outer tubular member, means for impressing a temperature gradient upon said separation chamber and means for moving said inner movable tubular member in an axial direction relative to said stationary outer member whereby the effective length of said separation chamber may be altered.

2. A thermal diffusion apparatus comprising a stationary outer tubular member and an inner tubular member having a smaller outside diameter than the inside diameter of said outer tubular member movably mounted in concentric relation to said outer member, said outer tubular member having a seal retaining means and an O-ring seal operatively associated therewith, said inner tubular member having a seal retaining means and an O-ring seal operatively associated therewith spaced apart from said retaining means and O-ring associated with said outer member so as to provide a thermal diffusion separation chamber in the annular space between said outer and inner tubular members, inlet conduit means for introducing a liquid to said separation chamber, two outlet conduit means for withdrawing two liquid products simultaneously from said separation chamber, first port means communicating with one of said outlet conduit means and said separation chamber located at the upper extremity of said inner tubular member, second port means communicating with the other of said outlet conduit means and said separation chamber located at the lower extremity of said outer tubular member, means for impressing a temperature gradient upon said separation chamber, and means for moving said inner movable tubular member in an axial direction relative to said stationary outer member whereby the effective length of said separation chamber may be altered.

3. A thermal diffusion apparatus comprising a stationary outer tubular member and an inner tubular member having a smaller outside diameter than the inside diameter of said outer tubular member movably mounted in concentric relation to said outer member, said outer tubular member having a seal retaining means and a seal operatively associated therewith, said inner tubular member having a seal retaining means and a seal operatively associated therewith spaced apart from said retaining means and seal associated with said outer member so as to provide a thermal diffusion separation chamber in the annular space between said outer and inner tubular members, inlet conduit means for introducing a liquid to said separation chamber, two outlet conduit means for withdrawing two liquid products simultaneously from said separation chamber, first port means communicating with one of said outlet conduit means and said separation chamber located at the upper extremity of said inner tubular member, second port means communicating with the other of said outlet conduit means and said separation chamber located at the lower extremity of said outer tubular member, means for impressing a temperature gradient upon said separation chamber and means for moving said inner movable tubular member in an axial direction relative to said stationary outer member comprising a screw-threaded member attached to said inner tubular member operably engaged to a nut secured by nut-retaining means attached to said outer tubular member whereby the effective length of said separation chamber may be altered.

References Cited in the file of this patent

UNITED STATES PATENTS

| | | |
|---|---|---|
| 2,541,069 | Jones et al. | Feb. 13, 1951 |
| 2,789,946 | Thomas | Apr. 23, 1957 |